United States Patent [19]
Licht

[11] 3,715,521
[45] Feb. 6, 1973

[54] RECORDER APPARATUS USING FLUID SUPPORT

[75] Inventor: John H. Licht, Middletown, N.J.

[73] Assignee: AMBAC Industries, Incorporated, Philadelphia, Pa.

[22] Filed: Aug. 24, 1971

[21] Appl. No.: 174,566

Related U.S. Application Data

[63] Continuation of Ser. No. 818,880, April 24, 1969, abandoned.

[52] U.S. Cl...179/100.2 P, 340/174.1 E, 346/74 MC

[51] Int. Cl...........................G11b 5/60, G11b 21/20

[58] Field of Search....179/100.2 P, 100.2 PM, 100.2 C; 340/174.1 E, 174.1 F; 346/74 MC; 226/49, 97

[56] References Cited

UNITED STATES PATENTS

| | | | |
|---|---|---|---|
| 3,219,990 | 11/1965 | Goehle | 179/100.2 P |
| 2,883,475 | 4/1965 | Ridler et al. | 179/100.2 P |
| 2,710,234 | 6/1955 | Hansen | 179/100.2 P |
| 2,612,566 | 9/1952 | Anderson et al. | 340/174.1 E |
| 2,945,697 | 7/1960 | Maeder | 170/100.2 P |
| 3,143,267 | 8/1964 | Maxey | 340/174.1 E |
| 3,416,148 | 12/1968 | Berghaus et al. | 179/100.2 P |
| 3,435,441 | 3/1969 | Stahler | 179/100.2 P |

*Primary Examiner*—Vincent P. Canney
*Assistant Examiner*—Alfred H. Eddleman
*Attorney*—Hawson & Hawson

[57] ABSTRACT

A long-life, high-reliability magnetic tape recorder in which the relatively-moving parts of the system are separated from each other by fluid films. The recorder components are immersed in a fluid contained in a sealed housing which serves as a fluid supply reservoir. A pump in the housing pumps the fluid to fluid-film devices for rotatably supporting a pair of tape reels and a capstan drive system, and for urging the tape against the capstan drive member. The pump also supplies fluid under pressure to a tape guide and to a magnetic head in such manner as to hold the moving tape out of contact with the guide and with the head; it also supplies pressurized fluid to its own fluid-film device to support its own moving parts. The fluid-film structure for the magnetic head provides a fixed spacing of the moving tape from the head for both high and low tape speeds and despite substantial changes in fluid viscosity.

6 Claims, 15 Drawing Figures

INVENTOR:
JOHN H. LICHT
BY
Howson & Howson
ATTYS

INVENTOR:
JOHN H. LICHT
BY
Hourdon & Hourdon
ATTYS.

INVENTOR:
JOHN H. LICHT
BY Howson & Howson
ATTYS.

RECORDER APPARATUS USING FLUID SUPPORT

This application is a continuation of U.S. patent application Ser. No. 818,880 of John H. Licht, entitled "Recorder Apparatus Using Fluid Support", filed Apr. 24, 1969, and now abandoned.

BACKGROUND OF INVENTION

Tape recorders have long been known in the art in which a magnetic tape is moved past a magnetic head for producing recording on the tape or play-back therefrom. Such apparatus is widely used both commercially and in military aerospace applications. The reliability and longevity of high-quality performance of such apparatus has in the past generally been adequate for most applications. However, with recent improvements in the reliability of other associated apparatus, and particularly with the advent of reliable long-life solid-state devices, in some applications the tape recorder has become one of the weaker links in the effort toward greater reliability and longevity with trouble-free, high-quality performance.

One particular area of application in which this is especially true is in the field of tape recorders for use in spacecraft. By using solid-state apparatus, the extreme degree of reliability and longevity required for such applications has been attained for much of the electronic circuitry used in the spacecraft, but the tape recorder apparatus has often been subject to mechanical failure of critical and sensitive sub-assemblies, particularly after prolonged use. For example, reliable long life of mechanical bearings in tape recorders, particularly after severe environmental tests and launching operations and without benefit of maintenance, has been very difficult to attain consistently. Another problem has been in maintaining the integrity of the magnetic tape and the message recorded thereon, and to maintain optimum performance of the magnetic head, especially in view of frictional contact with the tape which normally occurs as the tape moves. These problems become particularly severe when both slow and fast operations of the recorder are desired for different functions.

While it may be possible to approach the desired reliability and longevity by extremely close control of quality and tolerances, this would be extremely costly, and unlikely to produce a degree of longevity and reliability comparable with that of associated solid-state equipment.

Accordingly it is an object of the invention to provide new and useful tape recording apparatus.

Another object is to provide such apparatus characterized by improved reliability and longevity.

A further object is to provide such apparatus in which mechanical wear is minimized.

It is also an object to provide such apparatus in a form suitable for use in spacecraft.

Another object is to provide, in a form suitable for use in such apparatus, new and useful magnetic head means.

It is also an object to provide new and useful guide means, capstan drive means and support means suitable for use in such apparatus.

A further object is to provide tape recorder apparatus in which fluid separation and support are provided for all or most of those parts which normally move in sliding frictional contact with another solid part, thereby obviating problems due to frictional wear.

It is also an object to provide a new and useful magnetic head for a tape recorder in which friction between the tape and the head is eliminated and reliable high-quality performance made possible, despite substantial changes in tape speed and in operating temperature.

SUMMARY OF THE INVENTION

These and other objects of the invention are achieved by the provision of apparatus comprising a magnetic head for interacting with a tape to produce recording or play-back from the tape, in which the path of the moving tape is maintained in a predetermined spaced relation to the surfaces of the head by fluid-film means associated with the head and exerting a fluid pressure against the adjacent tape surface. In the preferred form of the invention, the head is a magnetic recording and/or playback head comprising two portions defining two confronting parallel surfaces between which the tape passes in its normal motion, and hydrostatic fluid-pressure means direct a flow of fluid against both of the opposite surfaces of the tape as it passes through the head. In one preferred form the opposed head surfaces are not flat but are shaped to accommodate a tape path curved along the length of the tape as it passes through the head, the opposed surfaces preferably having a greater radius of curvature near the center of the tape path through the head than at positions nearer the edge of the head, and recording and/or playback are performed in the latter region of greater radius of curvature.

Preferably also, fluid-film means are used to maintain the tape out of contact with guide means toward which it is urged by the tension of the tape, and to urge the tape against a hydrostatically-supported capstan-drive means thus providing in effect a fluid-pressure pad or shoe. The tape is preferably driven by electric motor means having a rotor which is fluid-film supported and which drives the capstan-drive means. Preferably, electric motor means with fluid-film-supported rotors are also used to support and rotate a pair of supply and take-up tape reels. Also preferably employed is a surrounding housing serving as a reservoir for fluid in which the tape recorder apparatus is immersed, together with fluid pump means which receives fluid from the reservoir and delivers it under pressure to the various fluid-film means described above.

As a further preferred feature, the pump means has its own fluid-film support means for its rotor, supplied with fluid from the outlet of the pump.

In the preferred embodiment taken as a whole, tape recorder apparatus is provided in which all relatively moving surfaces are separated by fluid so that mechanical wear is minimized and longevity and reliability greatly enhanced.

BRIEF DESCRIPTION OF FIGURES

These and other objects and features of the invention will be more readily understood from a consideration of the following detailed description, taken in connection with the accompanying drawings, in which.

DETAILED DESCRIPTION OF PREFERRED EMBODIMENTS

Figures 1, 2:
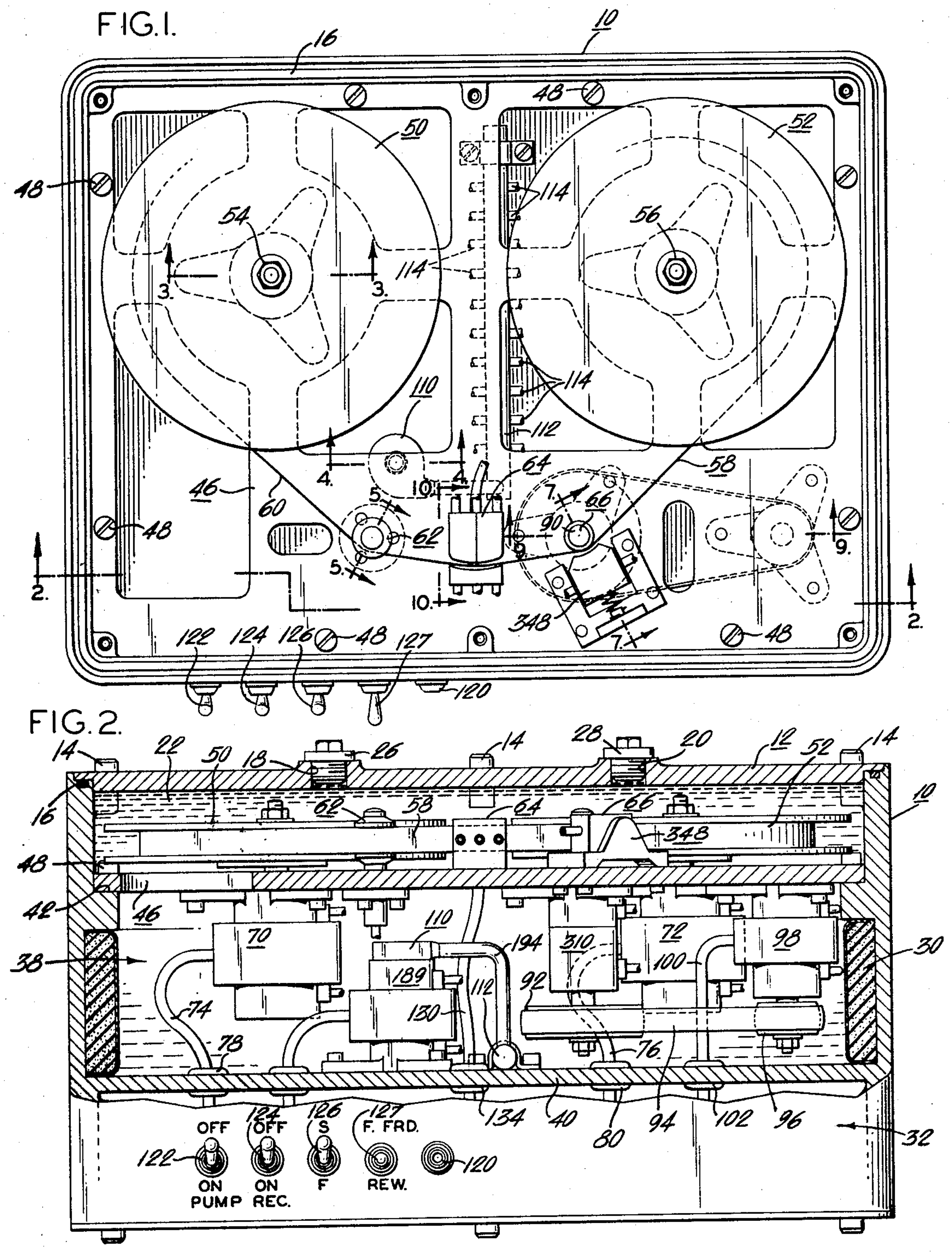
FIG. 1 is a plan view of tape recorder apparatus in accordance with the invention.
FIG. 2 is a sectional view taken along lines 2—2 of FIG. 1.

Referring now to the specific embodiment of the invention shown by way of example only in the drawings, an outer housing 10 is closed by a top cover 12 secured by screws, such as 14, and fluid-sealed by gasket 16 positioned around the edge of the top cover. A pair of openings 18 and 20 in top cover 12 facilitate filling of the interior of housing 10 with an inert fluid 22 in liquid form, after which openings 18 and 20 may be closed tightly by threaded plugs 26 and 28 respectively. Around the interior of a portion of the side walls of housing 10 there is provided a resilient liner 30, such as a plastic foam elastomer covered with a fluid-impervious outer covering, for absorbing the effects of expansion of fluid 22 and of other elements within the upper part of housing 10 due to increases in temperature. Typically housing 10 may be filled with fluid while the entire assembly is at the lower end of its operating temperature range, thereby to assure that the interior will remain completely filled with fluid despite temperature increases occurring thereafter.

The interior of housing 10 is divided into a lower compartment 32 and an upper compartment 38, the latter of which is the one which is filled with fluid. The lower compartment 32 contains various electrical components and circuitry as needed or desired for operation of the recorder and its associated equipment. Integral false bottom 40 provides the division between the upper and lower interior compartments within housing 10.

A shoulder 42 is provided around the periphery of the interior of housing 10 to receive an apertured supporting plate 46, which is held in place by screws such as 48 and supports various of the operating elements of the recorder apparatus.

A pair of tape reels 50 and 52 are mounted to rotate in a common horizontal plane about corresponding spaced-apart vertical axes extending through their respective centers, and are held on by nuts 54 and 56 respectively. The reels may be conventional in form, and adapted to provide for the winding up of the magnetic tape 58 onto one of them simultaneously with unwinding from the other, as the reels rotate in the same direction. A free portion 60 of tape 58 extends between the reels along a path defined by tape guide means 62, magnetic head 64 and capstan drive means 66. Reels 50 and 52 are driven for tape supply and tape take-up purposes by electric motors 70 and 72 respectively, located between supporting plate 46 and false bottom 40. Electrical power for motors 70 and 72 is supplied by way of cables 74 and 76 respectively, which extend downwardly through false bottom 40 to the interior of compartment 32 by way of appropriate fluid seals 78 and 80 respectively; the latter seals may be replaced by sealed feed-through plug-and-socket arrangements if desired.

The capstan drive pin 90 is rotated, through the agency of a first pulley 92 and a belt 94 and a second pulley 96, by electric motor 98. The latter motor is supplied with operating electrical power by way of cable 100, extending through a fluid seal 102 in false bottom 40.

Fluid pump means 110 is positioned in upper compartment 38 so as to pump fluid 22 from the interior of the latter compartment to a distributing line 112, from which branch lines such as 114 deliver pressurized fluid to various points in the apparatus in a manner and for the purposes described in detail hereinafter. In the interests of clarity, the interconnecting portions of the branch lines extending from the distributing line 112 to the various points in the system which to be supplied with pressurized fluid, are not shown in their entireties, it being understood however that they are present and may take any convenient form such as rigid or flexible piping.

The front panel of lower compartment 32 in housing 10 is provided with an electrical connecting socket 120 through which an appropriate external electrical power line may supply operating power for the unit, and through which operating current to and signal current from the magnetic head may also pass. Also provided are an on-off pump switch 122 for controlling operation of the motor of pump means 110; an on-off recorder switch 124 for controlling operation of the reel and capstan drive motors; a slow-fast switch 126 is also provided, having two positions for providing two different operating speeds for tape 58 during recording or play-back; and a fast-forward and rewind switch 127 having three positions, namely a neutral center position, an upper position for advancing the tape forwardly at a very high rate, and a lower position for producing rapid tape re-wind. Connections and circuitry for providing such operations being well-known there is no need to show them in detail herein, and it will be understood that they may be located within the lower compartment 32 in conventional manner.

Magnetic head 64 is provided with an electrical cable 130 extending downward into lower compartment 32 by way of fluid seal 134, to provide appropriate electrical connections to the head 64 as required for recording or play-back purposes.

For normal operation the apparatus is assembled as shown, the on-off switch pump 122 turned to its "on" position and, after a few seconds required for the pump means 110 to come up to speed, the recorder on-off switch 124 is turned on to operate the capstan drive means 66 and the reel motors 70 and 72, and thereby cause the free tape portion 60 to move around tape guide means 62 and through magnetic head 64, thereby enabling recording on, or playback from, the tape as determined by signals delivered to, or derived by, the head 64. During this operation the reels 50 and 52 rotate to provide tape supply and take-up, thereby maintaining the tape taut. Reels 50 and 52 may have associated with them conventional equipment (not shown) for preventing overrunning of the supply reel and for assuring take-up by the take-up reel. The speed of the tape during recording or playback is controlled by the position of switch 126, switch 127 being positioned in its neutral position. Switch 127 may be operated to its upper or lower position when it is desired to move tape rapidly from one reel to the other.

During these operations, the construction now to be described in detail causes the rotating parts of the reel drive motors, of the pump means and of the capstan drive means to be supported on fluid films even at low tape speeds, and causes the free portion 60 of tape 58 to move free of mechanical contact with guide means 62 and magnetic head 64. In addition, the pressure pad arrangement in capstan drive means 66 urges the free portion of the tape against the capstan drive pin 90 without contacting the tape mechanically.

Figures 3, 4, 5, 6, 7, 8, 8A, 9:
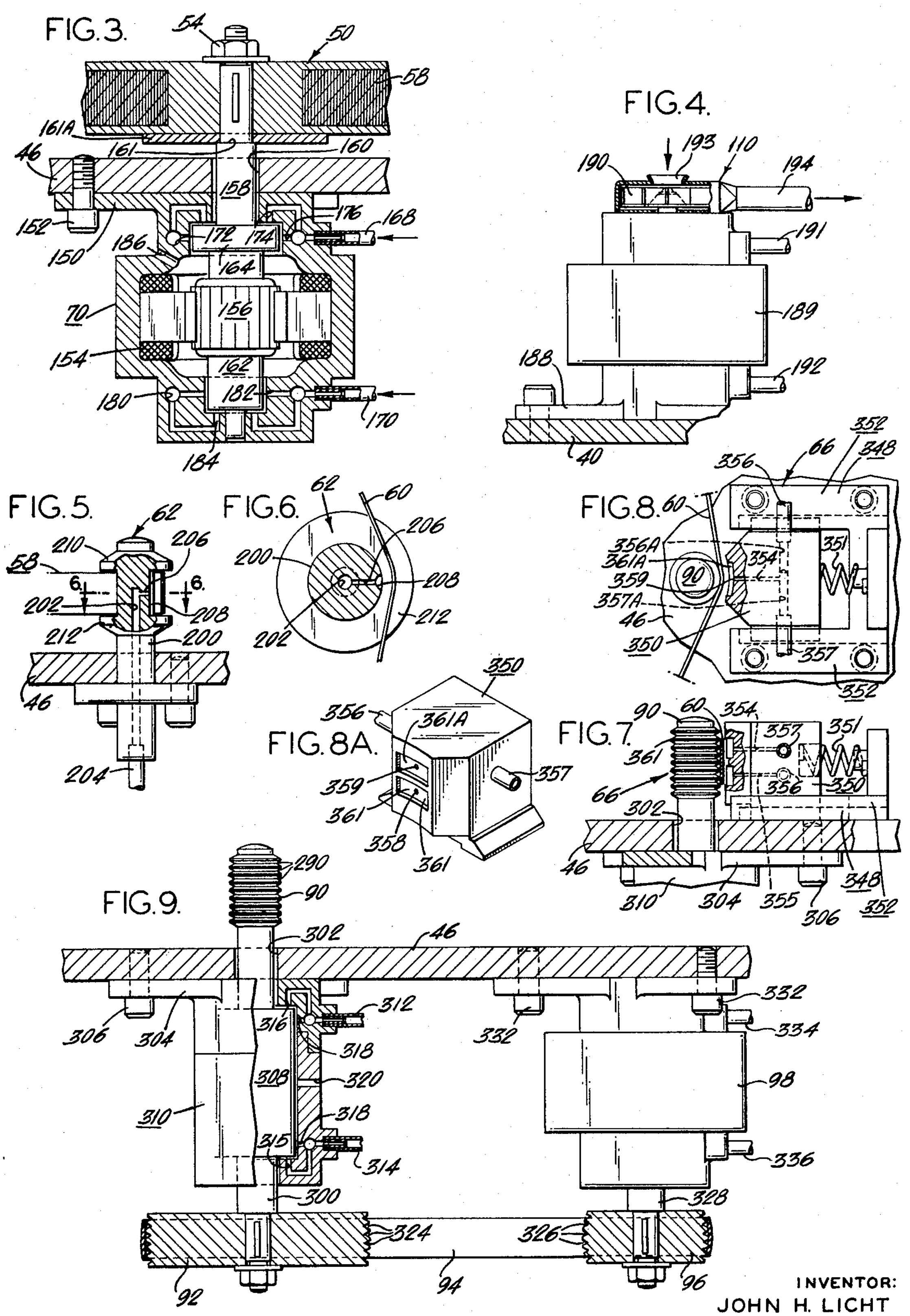
FIG. 3 is a fragmentary sectional view taken along lines 3—3 of FIG. 1.
FIG. 4 is a fragmentary sectional view taken along lines 4—4 of FIG. 1.
FIG. 5 is a fragmentary sectional view taken along lines 5—5 of FIG. 1.
FIG. 6 is a sectional view taken along lines 6—6 of FIG. 5.
FIG. 7 is a fragmentary sectional view taken along lines 7—7 of FIG. 1.
FIG. 8 is a plan view, with parts broken away, of the apparatus of FIG. 7.
FIG. 8A is a perspective view of a part of the apparatus of FIG. 7.
FIG. 9 is a sectional view taken along lines 9—9 of FIG. 1.

Referring now to FIG. 3 for the details of the electric drive and support means for reel 50, which details may be identical with those for reel 52, a motor support 150 is fastened by screws such as 152 to the underside of supporting plate 46 and serves to mount the coils 154 of the motor 70, which motor may be of the induction type. The rotor 156 of the motor 70 is disposed concentrically within coils 154 and has an upwardly-extending integral drive shaft 158 for supporting and rotating the tape reel 50. Drive shaft 158 extends upwardly through a clearance hole 160 in supporting plate 46. A shoulder 161 on shaft 158 and a washer 161A on shoulder 161 serve to hold the reel 50 in position on the shaft 158.

Rotor 156 is supported for rotation on a fluid film by a hydrostatic support system acting on a lower stub shaft 162 and an upper circular flange 164, both integral with rotor 156. The arrangement for the hydrostatic support of rotor 156 may be similar to that utilized in known hydrostatic bearings for other purposes. In this example, fluid under pressure from pump means 110 is supplied to inlets 168 and 170. Pressurized fluid from inlet 168 flows through an appropriate encircling manifold 172 and thence through circumferentially disposed ports such as 174 and 176 at the edge and top of the flange 164 to hold the latter flange centered against upward and sideways motion in the closely-surrounding chamber provided by motor support 150. Pressurized fluid from inlet 170 passes through encircling manifold 180 to side and bottom ports such as 182 and 184 respectively for centering stub shaft 162 against lateral and downward motion. Suitable flow restrictors may be used where appropriate. It will be understood that rotor 156 is immersed in the fluid 22 and is substantially buoyed thereby, and that vent openings such as 186 may be provided through the sides of motor support 150 to enable free flow of fluid 22 through the interior of the motor support.

Accordingly, when pump means 110 is operating to supply pressurized fluid to inlets 168 and 170, and when the recorder on-off switch 124 is in its "on" position so as to supply current to coils 154, rotor 156 will rotate on a fluid-film support, free of frictional contact with any solid surfaces, and will thus support and rotate reel 50 without being subject to wear.

It will be understood that in cases in which the rotor 156 is rotated rapidly a conventional hydrodynamic bearing may be used for its support, and that the general type of arrangement shown in FIG. 3 may be designed to provide hydrostatic bearing support at low rotor speeds and additional hydrodynamic support at higher rotor speeds, as during rewind or fast-forward advance of the tape.

As mentioned above, the motor assembly for reel 52 may be identical with that for reel 50 and hence need not be described further.

FIG. 4 illustrates one form for the pump means 110, which is mounted by a frame 188 on false bottom 40, and comprises a motor 189 having a hydrostatically-supported rotor for rotating the centrifugal impeller 190. The motor and rotor-support arrangement may be like that of FIG. 3, pressurized fluid being supplied to bearing inlets 191 and 192. Pump inlet 193 communicates with the reservoir of fluid 22 in housing 10, and impeller 190 pumps fluid 22 out of pump outlet 194 to distributing line 112. If desired, fluid may be supplied to bearing inlets 191 and 192 from the pump outlet directly, rather than by way of the distributing line and return branch lines, so as to provide earlier hydrostatic support of the rotor for pump means 110 upon pump start-up. During the initial phase of pump start-up, the pump rotor may be supported by conventional boundary-layer bearing action, but will quickly achieve hydrostatic support.

Referring now to FIGS. 5 and 6 for details of the tape guide means 62, guide pin 200 of generally cylindrical form is mounted in a fixed upright position, extending through and above supporting plate 46. A central axial bore 202 in guide pin 200 communicates at its lower end with an inlet connection 204 to which fluid under pressure is supplied from pump means 110. A transverse bore 206 communicates at one end with the upper end of axial bore 202 and at the other end with the outer cylindrical surface of pin 200 at port 208, whereby pressurized fluid is directed outwardly from against one side of the adjacent tape portion 60. Hydrostatic fluid-pressure means are thereby provided which apply sufficient pressure against the adjacent side of tape portion 60 to hold it slightly spaced from the surface of pin 200, despite the urging of tape portion 60 toward pin 200 in response to the tensioning of the tape by the action of the capstan drive means. Tape portion 60 is therefore supported on a fluid film at guide means 62, and mechanical friction and wear on the tape thereby eliminated. Upper and lower guide flanges 210 and 212, respectively, are spaced slightly from the upper and lower edges of tape portion 60 to limit any upward or downward wandering of the tape.

Referring now to FIGS. 7, 8, 8A and 9 for the details of the preferred arrangement of the capstan drive means 66, capstan drive pin 90 is preferably circumferentially grooved as at 290 to enhance its driving action on the fluid-immersed tape portion 60, and is supported and rotated by means of a drive shaft 300 with which it is integral. Drive shaft 300 extends vertically upward through a clearance opening 302 in supporting plate 46, and is fluid-film supported; in this example it is hydrostatically mounted for rotation in a frame 304 secured to the undersurface of supporting plate 46 by screws such as 306. To provide the latter hydrostatic support, shaft 300 is provided with an enlarged cylindrical portion 308 mounted within a closely-conforming chamber 310 within supporting frame 304, and pressurized fluid from pump means 110 is supplied to fluid inlets 312 and 314, which communicate, through appropriate bores in supporting frame 304, with upwardly-acting ports such as 315, downwardly-acting ports such as 316, and laterally-acting ports such as 318, in a manner which will be apparent to one skilled in the art.

Vent openings such as 320 may be provided in the side walls of chamber 310 to facilitate interflow of the fluid 22, and flow restrictors may be used where appropriate.

The configuration of the bearing and the fluid pressure are such that drive shaft 300 is hydrostatically supported for rotation free of contact with solid surfaces even for low speeds of rotation thereof.

First pulley 92, affixed to the lower end of drive shaft 300, is preferably provided with a circumferentially-grooved surface at 324 to provide better driving action by the fluid-immersed plastic belt 94. Second pulley 96 is preferably also provided with a circumferentially-grooved periphery at 326 to enchance drive action with respect to belt 94. Pulley 96 is driven in rotation by drive shaft 328, which in turn is integral with the rotor of electrical induction motor 98. Motor 98 is secured to the undersurface of supporting plate 46 as by screws 332, and it is understood that the rotor of motor 98 is fluid-film supported for rotation; in this example pressurized fluid for hydrostatic support of the rotor is supplied from pump means 110 to fluid inlets 334 and 336. The arrangements for hydrostatic support may be generally similar to that described with reference to the other electric motors 70 and 72.

The details of the fluid-film hydrostatic pressure-pad means 348 for urging the tape against the capstan drive pin 90 are shown most clearly in FIGS. 7, 8 and 8A. Pressure-pad means 348 comprises a head 350 in the form of a block slidably mounted in a channel arrangement 352 on supporting plate 46. A spring 351 provides light spring pressure urging head 350 toward drive pin 90. Head 350 is provided with a pair of horizontally-extending bores 354, 355 fed with pressurized fluid from pump means 110 by way of inlets 356, 357 and transverse bores 356A, 357A, respectively. The discharge outlets or ports 358, 359 for bores 354, 355 are directed toward the axis of pin 90, are positioned one directly above the other, and are balanced with respect to the center-line of the tape portion 60. Preferably the ports 358, 359 are located in recesses 361, 361A and having a height slightly greater than that of the tape and curved along the direction of curvature of the tape as it passes pin 90. The pressurized fluid discharged from ports 358, 359 is directed against the side of tape portion 60 opposite pin 90 and serves as a fluid pressure pad to urge the latter tape against the surface of pin 90, thereby to enhance the driving action which the pin 90 exerts on tape 60 and to minimize any slippage in the capstan driving arrangement without mechanically contacting the tape.

Figure 11:
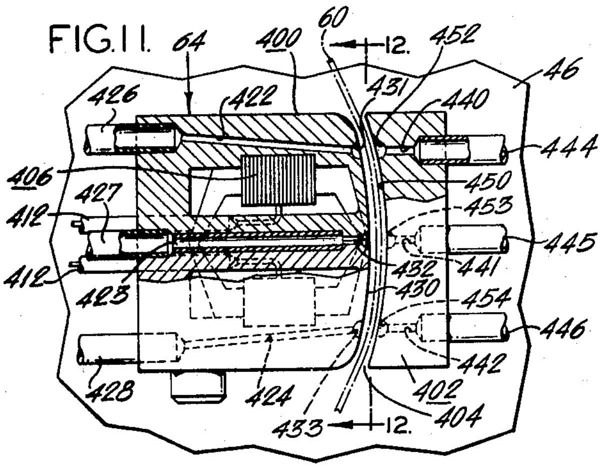
FIG. 11 is a plan view, with parts broken away, of the magnetic head of FIG. 10.
Figure 12:
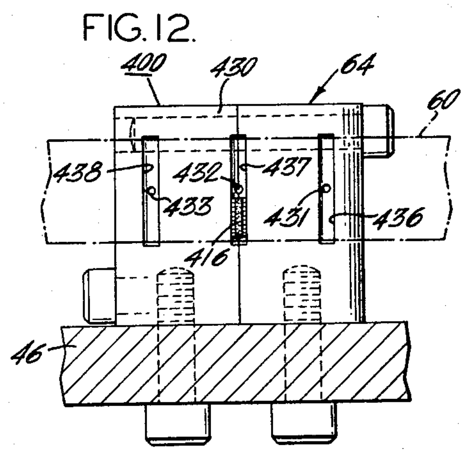
FIG. 12 is an elevational end view of the apparatus as shown in FIG. 11.
Figure 10:
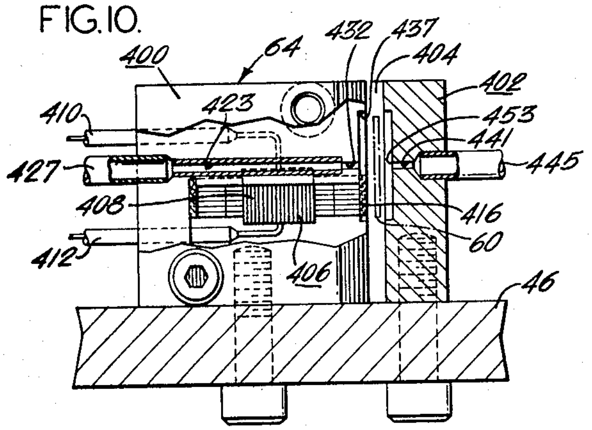
FIG. 10 is a sectional view taken along lines 10—10 of FIG. 1.

FIGS. 10–12 illustrate the details of one preferred embodiment of the magnetic head 64. In this example it comprises a transducer block 400 and a tape-backing block 402 which are bolted to the upper surface of supporting plate 46 in opposing arrangement, with their opposed faces extending substantially parallel to each other and spaced apart to provide a slit 404 through the center of which the free tape portion 60 passes. Block 400 contains the usual magnetic core structure 406, associated core windings 408, and electrical connections 410 and 412 for providing the required electrical interconnection to drive the magnetic head for recording and/or to deliver output signals during play-back. The magnetic interaction with the tape portion 60 occurs at that portion of the tape immediately adjacent the gap 416 in the magnet structure of the head. The details of the electromagnetic-interaction apparatus may themselves be conventional, and hence need not be described in detail. The portion of the magnetic head which is a primary interest with respect to the present invention relates to the arrangement and configuration of the opposed surfaces of the blocks 400 and 402, and to the apparatus for applying fluid pressure to opposite sides of tape portion 60 as it travels through the head 64, as will now be described.

Transducer block 400 is provided with three internal bores 422, 423 and 424 supplied at one end with fluid pressure from pump means 110 by way of respective fluid inlets 426, 427 and 428. The opposite ends of bores 422, 423 and 424 terminate at the opposite block surface 430; the latter bores are preferably of reduced diameter compared with their inlets so as to act as flow restrictors. Bores 422, 423 and 424 terminate in ports 431, 432 and 433 respectively which are spaced apart along the length of the tape portion 60 in slit 404; preferably the ports 431, 432, 433 are located in respective rectangular recesses 436, 437, 438 each slightly wider than its associated port and each having a height slightly greater than that of the tape portion 60.

In this example surface 430 is a smooth curve having its greatest radius of curvature (substantially flat) adjacent the magnet gap 416 at the center of the head. Port 432 is located above and in alignment with gap 416, and ports 431 and 438 are disposed symmetrically on opposite sides of gap 416. Ports 431, 432 and 433 therefore operate to direct a flow of fluid 22 against three spaced-apart portions of the adjacent side of tape portion 60 so as to urge tape portion 60 away from transducer block 400, against the urging of the tape toward block 400 due to its tension.

It will be appreciated that tape portion 60 is curved along its length as it passes through slit 404 and due to its tension tends to be urged toward surface 430 of transducer block 400. This curved shape lends the tape greater lateral flexural strength, and the positioning of ports 431 and 433 near the ends of slit 404 lends additional stability to the nearly-straight portion of the tape near the gap 416. Port 432 provides additional insurance that the tape will remain straight near gap 416.

While under ideal conditions the flow from ports 431, 432, 433 will maintain the desired spacing of tape portion 60 from block 400 and thus avoid the harmful effects of scraping of the tape against the head, this spacing in the general region of the magnet gap 416 will in practice tend to vary substantially with changes in tape speed or fluid viscosity, which will then, in turn, produce undesirable variations in the recording and play-back operations. This is particularly true when the velocity of tape portion 60 is to be intentionally changed for different operating purposes, as in the embodiment illustrated, and when the temperature is subject to large variation so as to vary the fluid viscosity substantially. In general, for example, when the tape portion 60 is run at a high speed it tends to lift farther from surface 430 of block 400, and is more subject to substantial high frequency response loss and local flutter effects in its spacing from block 400.

In accordance with a further preferred feature of the invention, the later difficulties are overcome by the use of the tape-backing block 402 containing three bores 440, 441, and 442, supplied with fluid pressure from pump means 110 by way of inlets 444, 445 and 446 respectively. The latter bores preferably serve as flow restrictors, and terminate at their opposite ends on surface 450 of tape-backing block 402, the latter surface preferably being parallel to the transducer block surface 430. The inner ends of bores, 440, 441 and 442 terminate in respective ports 452, 453 and 454, which are preferably aligned with the ports 431, 432, 433 respectively in the transducer block 400. Corresponding rectangular recesses like 436, 437, 438 are also provided. Ports 452, 453 and 454 therefore apply fluid pressure against the opposite surface of tape portion 60 in balancing relation to the pressure applied by ports 431, 432, 433 to produce a stable positioning of tape portion 60 despite changes in the speed of motion thereof. Preferably bores 440, 441 and 442 are of smaller diameter than bores 422, 423, 424, so that the pressure applied to the tape thereby is less than that due to bores 422, 423, 424 so as to maintain a net outward force urging tape portion 60 away from transducer block 400 while at the same time maintaining a stabilizing pressure on its outer surface.

In hydrostatic operation, i.e., at relatively low tape speeds, if the tape moves away from transducer block 400 toward backing block 402, the flow from ports 431, 432, 433 will increase because of the reduced back-pressure, producing a greater pressure drop in one or more of restrictor bores 422, 423, 424 and reduced pressure at ports 431, 432, 433, while for converse reasons the pressure at ports 452, 453, 454 will increase; the result is a pressure differential between opposite sides tending to return the tape to its original position. This provides positional stabilization of the tape despite changes in tape speed and fluid viscosity.

In hydrodynamic operation, i.e., at relatively high tape speeds, if the tape moves away from transducer block 400 toward backing block 402, the film thickness decreases and thus the hydrodynamic pressure increases between the tape and block 402. For converse reasons the hydrodynamic pressure decreases between the tape and block 400.

By way of example only, the inlet pressures for the bore in magnetic head 64 may be of the order of 1 to 3 p.s.i.; the restrictor bore diameters may be of the order of 5 to 40 mils and may be provided by inserts in the form of hypodermic needle sections; the tape thickness may be about 1 to 2 mils, the width of the slit 404 on each side of the tape a few ten-thousandths of an inch, the ports in the blocks 400 and 402 may be spaced from each other along the tape by about one-half inch, the tape height may be about one-fourth to 1 inch, and the tape speeds from 0.1 to 120 inches per second.

Figure 13:
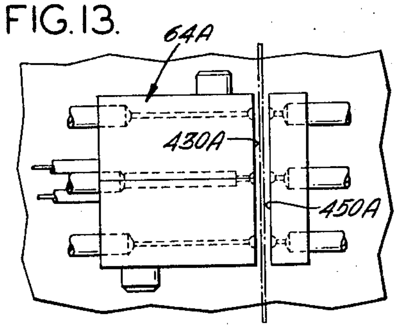
FIGS. 13 and 14 are plan and side views respectively of an alternative form of the magnetic head suitable for use in the invention.
Figure 14:
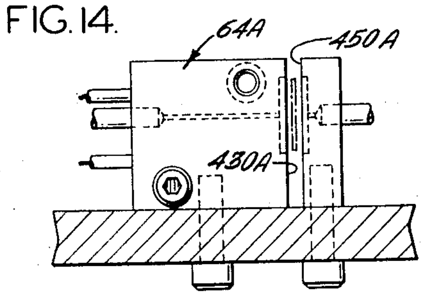

FIGS. 13 and 14 illustrate a magnetic head 64A which may be substituted for magnetic head 64 when the relative positions of head 64A, of guide means 62 and of capstan drive means 66 are such that the free tape portion 60 extends in a straight line through the magnetic head 64A. This arrangement may be identical with that illustrated in FIG. 10, except that the opposed surfaces 430 and 450 of FIG. 10 (430A and 450A in FIG. 13) are flat in this example. While this arrangement can be used in certain applications, the straight tape passing through magnetic head 64A does not possess as great flexural strength as does a tape bent in a curve as in the arrangement of FIG. 10, and hence is more susceptible to undesirable local deflections within head 64A.

The fluid 22 is preferably an inert fluorochemical liquid, such as types FC-74 and FC-43 available from Minnesota Mining and Manufacturing Company. Such liquids have low dielectric constant and dissipation factors and high electrical strength and resistivity, are inert to thermal and chemical change, and are non-flammable and non-reactive with common construction materials. In addition they have low surface tension, high density, and a boiling point typically in the range of about 210° to 355° Fahrenheit. Other liquids having similar properties may be utilized instead.

While in the particular embodiment described in detail the recorder components are completely immersed in fluid, in other embodiments a pump input sump may be flooded by gravity flow and the mechanism fluid supply provided solely by tubing connected to the output of the pump; thus, in general, flooded operation is not required.

Also, while the tape has been shown as supported on and transferred between supply and take-up reels, an endless single loop of tape or an endless loop cartridge may be used instead and the reels eliminated. In addition, other recording media such as paper or punch-card material may be used instead of magnetic tape, with appropriate recording and/or sensing apparatus positioned adjacent the recording medium.

While the invention has been described in the interest of definiteness with particular reference to specific embodiments thereof, it will be apparent that it may be embodied in a variety of forms diverse from those specifically described without departing from the spirit and scope of the invention.

I claim:

1. A magnetic head comprising: two spaced-apart portions having two corresponding, substantially continuous, confronting generally-parallel surfaces rigidly fixed in position with respect to each other for receiving in the channel between them a moving magnetic tape disposed substantially parallel to and spaced from each of said surfaces; at least one of said magnetic head portions comprising means for interacting magnetically with said tape in said channel to effect recording, playback or erasure of information on said tape while it passes through said channel; mechanical tape-moving means for acting on said tape at a position external to said channel to move said tape through said channel at a first rate of speed; and a fluid in the region between said surfaces; said surfaces being sufficiently close together and of sufficient extent to provide a thin hydrodynamically-acting film of said fluid on each side of said tape when said tape is moved through said channel at said first rate, whereby the movement of said tape through said channel at said rate by said tape moving means generates hydrodynamic forces maintaining said tape at a substantially fixed distance from said magnetically interacting means.

2. The magnetic head of claim 1, comprising a first port means in one of said two head portions for delivering said fluid under pressure to one side of said tape in said channel, second port means in the other of said two head portions for delivering said fluid under pressure to the other side of said tape in said channel, and means for supplying said fluid under pressure to said first and second port means to provide a balanced, elevated hydrostatic pressure on opposite sides of said tape so that, when said tape is moved through said channel at a second rate sufficiently low that said hydrodynamic positioning does not occur, it is stabilized hydrostatically at a lateral position in said channel which is substantially the same as the lateral position which said hydrodynamic action tends to produce, said mechanical tape-moving means being controllable to move said tape at either said first rate or said second rate, substantially independently of said delivery of said fluid under pressure to said sides of said tape.

3. The magnetic head of claim 2, in which said means for supplying said fluid under pressure to said first and second port means comprises a source of said fluid under pressure, restrictor means supplying said fluid from said source to each of said port means, each of said port means having a cross-sectional area large compared with that of each of said restrictor means whereby when said tape tends to move laterally away from one of said parallel surfaces the fluid pressure on that side of said tape decreases and that on the other side of the tape increases to counteract said tendency to move.

4. The magnetic head of claim 3, in which said first and second port means are directly opposite each other with respect to said tape.

5. The magnetic head of claim 4, in which said first port means comprises a first plurality of ports and said second port means comprises a second plurality of ports, said first and second pluralities of ports being positioned directly opposite each other with respect to said tape and symmetrically disposed along said tape with respect to said means for magnetically interacting with said tape.

6. The magnetic head of claim 5, in which said parallel surfaces are curved along the direction of said tape.

* * * * *